United States Patent
Matsuyama (10) Patent No.: US 8,970,711 B2
(45) Date of Patent: Mar. 3, 2015

(54) IMAGING APPARATUS FOR CORRECTING DISTORTION IN IMAGE CAPTURED USING ROLLING SHUTTER METHOD AND DISTORTION CORRECTION METHOD

(75) Inventor: Ichiro Matsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/563,076

(22) Filed: Jul. 31, 2012

(65) Prior Publication Data

US 2013/0033623 A1 Feb. 7, 2013

(30) Foreign Application Priority Data

Aug. 4, 2011 (JP) ................................. 2011-170749

(51) Int. Cl.
*H04N 5/228* (2006.01)
*H04N 5/232* (2006.01)
*H04N 5/353* (2011.01)

(52) U.S. Cl.
CPC ....... *H04N 5/23212* (2013.01); *H04N 5/23251* (2013.01); *H04N 5/3532* (2013.01); *H04N 5/2329* (2013.01)
USPC ................. 348/208.4; 348/208.99; 348/222.1

(58) Field of Classification Search
USPC ....................................................... 348/241
See application file for complete search history.

(56) References Cited

U.S. PATENT DOCUMENTS

| 5,712,474 | A | * | 1/1998 | Naneda | ....................... 250/208.1 |
| 2004/0061800 | A1 | * | 4/2004 | Yamazaki | ..................... 348/349 |
| 2007/0030381 | A1 | * | 2/2007 | Maeda | .......................... 348/345 |
| 2007/0115364 | A1 | * | 5/2007 | Kumaki | .................. 348/208.99 |

FOREIGN PATENT DOCUMENTS

| JP | 2006-186885 A | | 7/2006 | |
| JP | 2011-103631 | * | 5/2011 | ............. H04N 5/232 |

* cited by examiner

*Primary Examiner* — Roberto Velez
*Assistant Examiner* — Stephen Coleman
(74) *Attorney, Agent, or Firm* — Canon USA Inc IP Division (57) ABSTRACT

An imaging apparatus includes an imaging unit configured to capture an image by using a rolling shutter method, a movement detection unit configured to detect a movement amount of the imaging apparatus relative to an object, an in-focus detection unit configured to detect an in-focus degree to the object, a distortion correction unit configured to correct a distortion in the image generated due to the rolling shutter method by changing a reading position of each line in the image, and a control unit configured to determine a correction amount of the distortion generated due to the rolling shutter method from the movement amount detected by the movement detection unit and the in-focus degree detected by the in-focus detection unit.

18 Claims, 12 Drawing Sheets

CAPTURED IMAGE
(NOT FOLLOWING)

FIG. 6B

DETERMINATION CRITERION
(NOT FOLLOWING)

FIG. 6C

CAPTURED IMAGE
(FOLLOWING)

FIG. 6D

V MOVEMENT
DETERMINATION CRITERION
(FOLLOWING)

CAPTURED IMAGE

FIG. 9B

DETERMINATION CRITERION

US 8,970,711 B2

IMAGING APPARATUS FOR CORRECTING DISTORTION IN IMAGE CAPTURED USING ROLLING SHUTTER METHOD AND DISTORTION CORRECTION METHOD

BACKGROUND OF THE INVENTION

1. Field of the Invention

The present disclosure relates to an imaging apparatus, such as a video camera or a digital camera, that corrects a distortion in an image captured by using the rolling shutter method.

2. Description of the Related Art

In recent years, many video cameras and digital cameras have employed complementary metal-oxide semiconductor (CMOS) image sensors of the rolling shutter method. This type of image sensors has a problem in that, due to occurrence of a time lag among imaging time points of the respective lines, an image captured with a panning operation is diagonally distorted, an image captured with a tilting operation is extended or shrunk, an image captured with a camera shake shows an undulating distortion, and a captured image of a moving object is distorted.

Such a camera is often combined with sensor driving of the global shutter method or a mechanical shutter when capturing a still image, thereby eliminating the time lag among imaging time points. However, these methods cannot expose the image sensor to light and read out an image from the image sensor simultaneously so as to increase an interval between imaging operations, and therefore is not suitable for taking a moving image.

Some cameras, which capture a moving image by the rolling shutter method, store the captured image in a buffer memory and change a reading position of each line, thereby correcting distortion, as discussed in Japanese Patent Application Laid-Open No. 2006-186885. The reading position of each line is determined by detecting a movement amount of the camera relative to an object by using, for example, a gyro sensor.

Figure 11A:
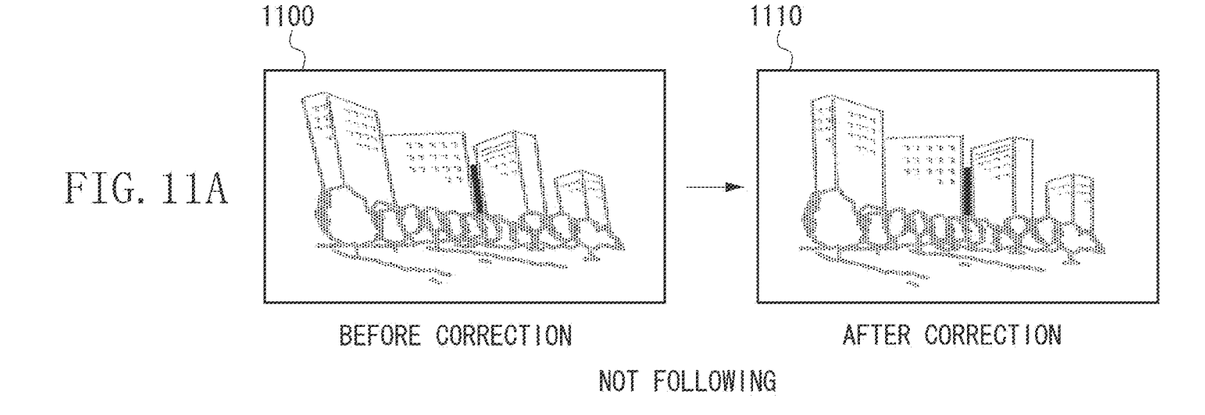
FIGS. 11A and 11B each schematically illustrate an example of a distortion correction according to a conventional technique.

For example, as illustrated in FIG. 11A, a captured image 1100 is diagonally distorted since it is captured while the camera is being panned to the left side, but can be output as a captured image 1110 with the distortion corrected by changing the reading position of each line with use of a detection result of a movement amount. The target object in the captured image 1100 is a landscape, and its distortion is effectively corrected.

However, according to the conventional correction method, if the camera moves by following a target object such as a running vehicle or person, correcting the image according to the movement of the camera results in a distortion of the target object image which is captured without being distorted in the original image, and an output of such an image.

Figure 11B:
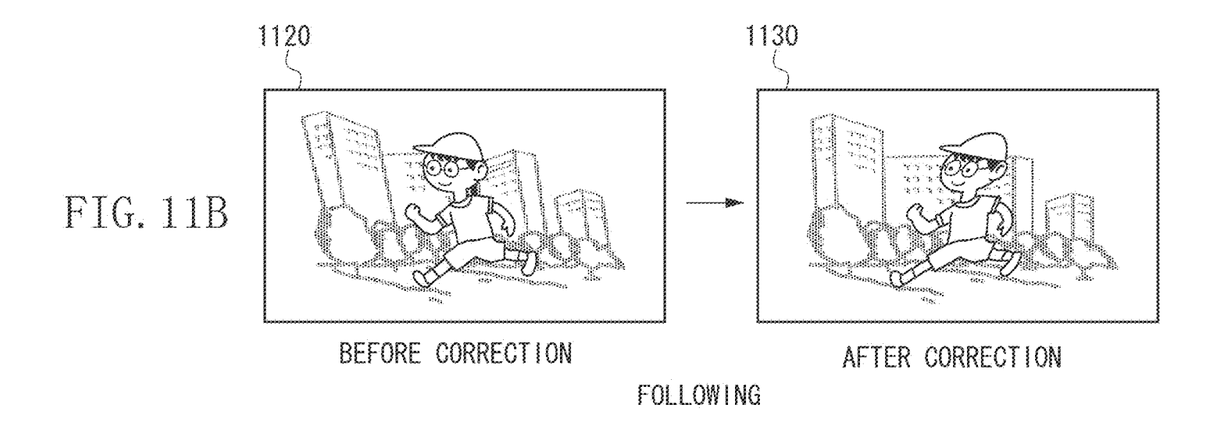

For example, as illustrated in FIG. 11B, a captured image 1120 is an image captured following a person running to the left side while the camera is being panned. In this case, the distortion is corrected based on the movement of the camera, whereby the corrected image 1120 is output as an image 1130 in which the person is distorted in the opposite direction.

The target object in the captured image 1120 is the person. Therefore, the correction of the image that results in a distortion of the person portion in the image is not an appropriate correction, even though this correction can eliminate the distortion of the landscape portion in the image.

SUMMARY OF THE INVENTION

The present disclosure is directed to an imaging apparatus using the rolling shutter method capable of capturing an image of an object followed by the imaging apparatus without causing a distortion of the image according to whether the imaging apparatus follows the object.

According to an aspect disclosed herein, an imaging apparatus includes an imaging unit configured to capture an image by a rolling shutter method, a movement detection unit configured to detect a movement amount of the imaging apparatus relative to an object, an in-focus detector configured to detect an in-focus degree to the object, a distortion corrector configured to correct a distortion in the image due to the rolling shutter method by changing a reading position of each line in the image, and a control unit configured to determine a correction amount of the distortion due to the rolling shutter method from the movement amount detected by the movement detection unit and the in-focus degree detected by the in-focus detector.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles disclosed herein.

DESCRIPTION OF THE EMBODIMENTS

Various exemplary embodiments, features, and aspects of the disclosure will be described in detail below with reference to the drawings.

Figure 1:
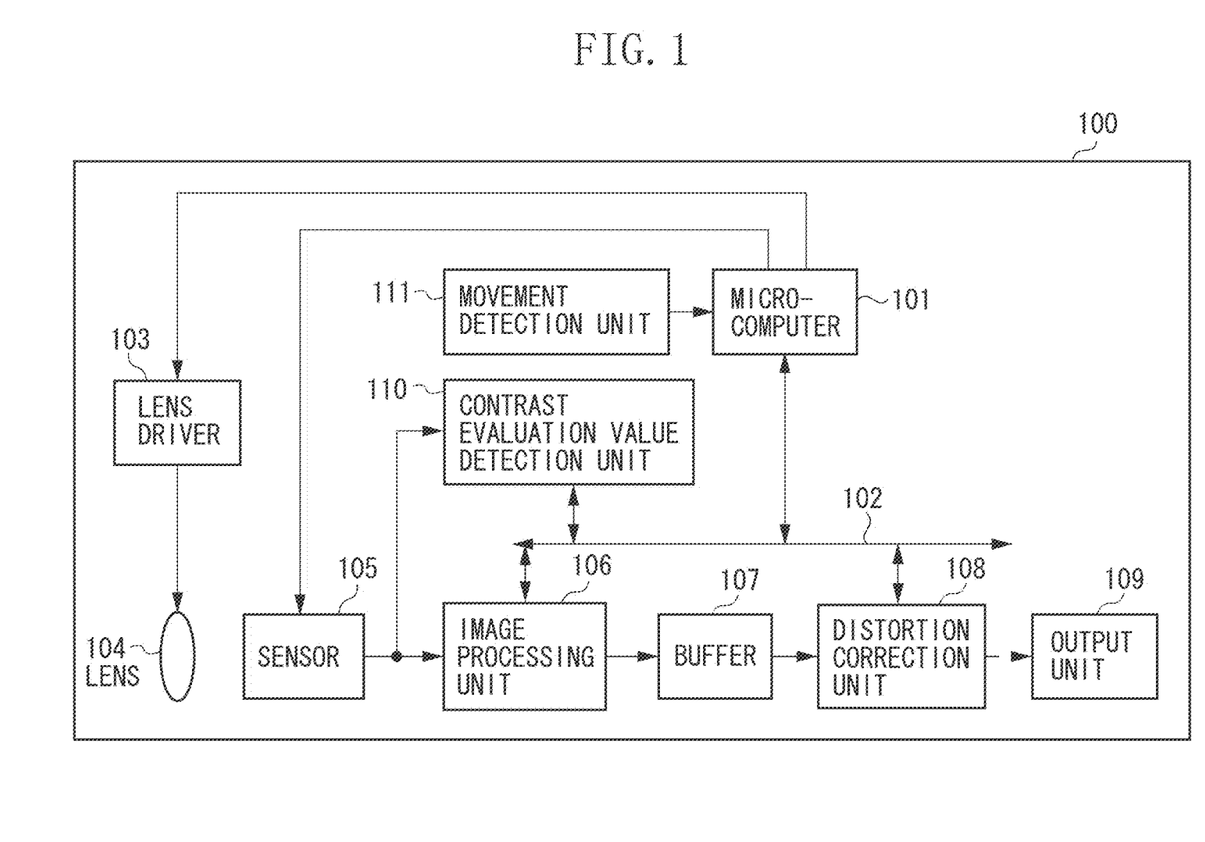
FIG. 1 is a block diagram illustrating a configuration of a video camera according to a first exemplary embodiment.

A first exemplary embodiment will be described as an example in which the present invention is applied to a video camera for outputting a captured moving image. FIG. 1 is a block diagram illustrating an example configuration of a video camera 100 according to the first exemplary embodiment.

A microcomputer 101 operates based on an internally stored control program. The microcomputer 101 uses an internal memory as a temporary data storage area during an operation and controls the respective blocks connected via a bus 102. An imaging optical system 104 is an imaging optical system including a focus lens.

An image sensor 105 is a complementary metal-oxide semiconductor (CMOS) image sensor employing a rolling shutter method, and converts an optical image, which is formed on an imaging plane via the imaging optical system 104 during an opening period of an electronic shutter based on a shutter speed set by the microcomputer 101, into an electrical signal to output an image signal. The image sensor 105 corresponds to an imaging unit in the present exemplary embodiment. As is the case with a commonly-used CMOS image sensor, a time lag occurs for each line in the opening period of the electronic shutter.

A lens driver 103 drives the focus lens in the imaging optical system 104 in an optical axial direction under the control of the microcomputer 101, thereby adjusting a focusing state of an optical image formed on the imaging plane of the image sensor 105. An image processing unit 106 applies development processing such as color conversion processing and gamma correction processing to the image signal output from the image sensor 105 under the control of the microcomputer 101, and stores acquired captured image data into a buffer memory 107. A distortion corrector 108 reads out the captured image data stored in the buffer memory 107, and corrects a distortion in the captured image due to the rolling shutter method under the control of the microcomputer 101.

More specifically, the distortion corrector 108 corrects the distortion by changing a reading position of each line. The reading position of each line is determined by detecting a movement amount of the video camera 100 relative to an object by using, for example, a gyro sensor. A distortion correction amount is determined by the microcomputer 101.

The microcomputer 101 corresponds to a control unit in the present exemplary embodiment. An output unit 109 outputs an image signal with its distortion corrected by the distortion corrector 108 to the outside. A movement detection unit 111 is, for example, a gyro sensor. The movement detection unit 111 detects an amount of a movement of the video camera 100 due to a camera shake or a panning operation, and notifies the microcomputer 101 of the movement amount.

A contrast evaluation value detection unit 110 performs automatic focusing control based on the commonly-used contrast detection method, and corresponds to an in-focus detector in the present exemplary embodiment. The contrast evaluation value detection unit 110 calculates an integral value of a luminance difference between adjacent pixels in a detection frame set so as to cut out a predetermined rectangular area in a captured image, and sets the calculated value as a contrast evaluation value indicating an in-focus degree.

If the focus lens in the imaging optical system 104 is located at an in-focus position when the distance between the video camera 100 and an object is not relatively changed, the contrast evaluation value increases since the edge portion of the object is clearly imaged. When the video camera 100 is an out-of-focus state, the contrast evaluation value is reduced.

Figure 2:
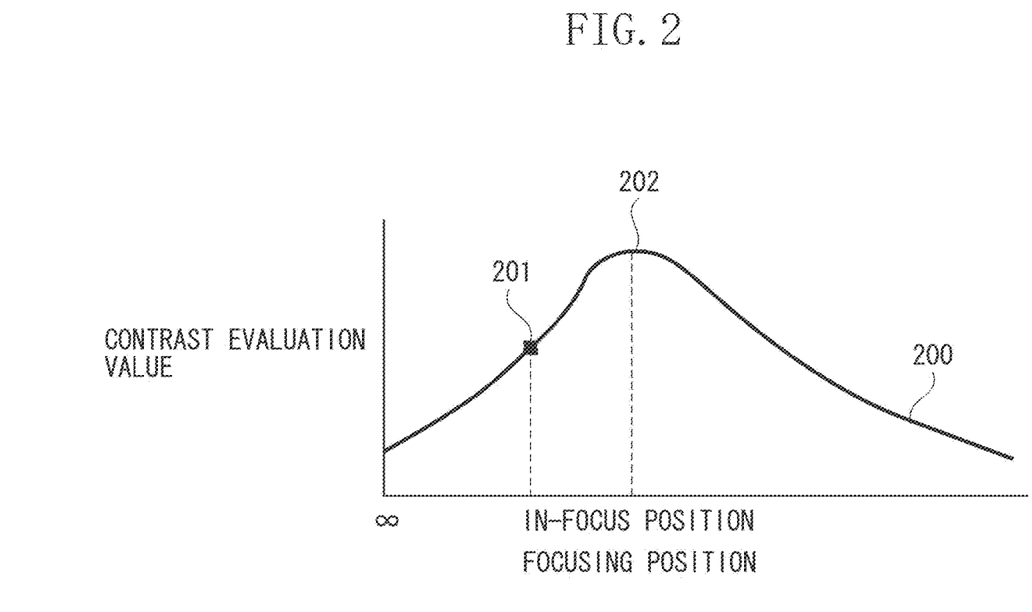
FIG. 2 illustrates a characteristic curve representing contrast evaluation values with respect to focus positions of a lens.

FIG. 2 illustrates a characteristic curve indicating contrast evaluation values with respect to focusing positions of the focus lens in the imaging optical system 104.

The microcomputer 101 slightly drives the focus lens in the imaging optical system 104 by the lens driver 103, and then acquires a contrast evaluation value, thereby determining whether the video camera 100 is in an in-focus state or an out-of-focus state. Further, if the video camera 100 is in an out-of-focus state, the microcomputer 101 determines in which direction the in-focus position of the focus lens in the imaging optical system 104 is situated from a current focusing position 201.

If the contrast evaluation value is small, the microcomputer 101 drives the focus lens as fast as possible in the direction for increasing the contrast evaluation value, and controls the focus lens in such a manner that the focus lens slows down as the contrast evaluation value is increasing and accurately stops at the top of the characteristic line 200 of the contrast evaluation value, i.e., an in-focus position 202.

On the other hand, when the video camera 100 is moving relative to an object (or the object is moving relative to the video camera 100), an image blur occurs in a captured image by an amount according to the shutter speed even if the focus lens is located at the in-focus position 202. Therefore, in this case, the edge of the object blurs and the contrast evaluation value is reduced.

Figure 3A:
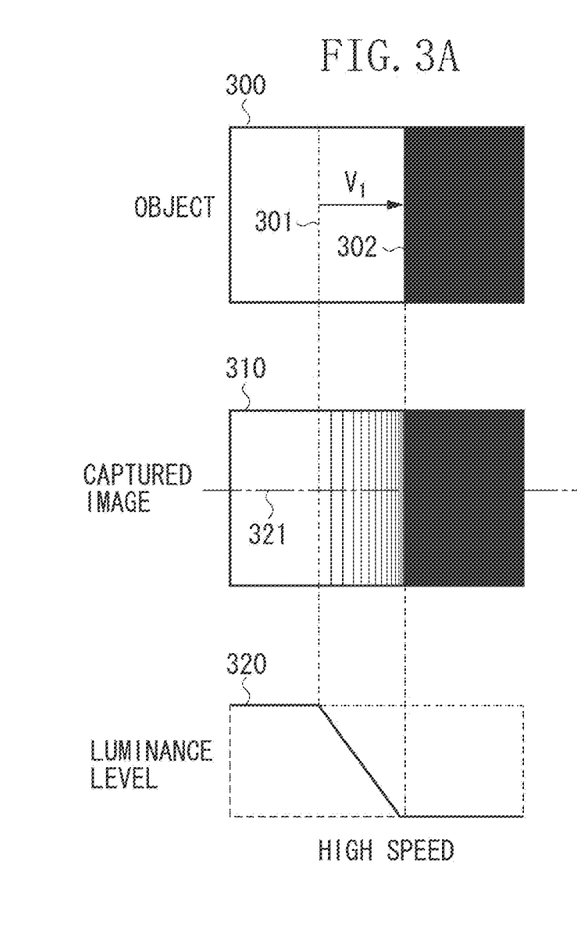
FIGS. 3A to 3C each schematically illustrate an imaging result of a borderline between a white area and a black area, which is moving at a predetermined speed.
Figure 3B:
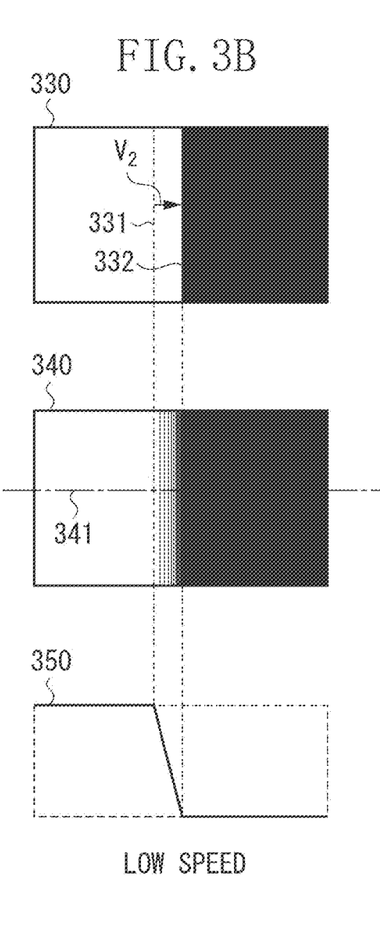
Figure 3C:
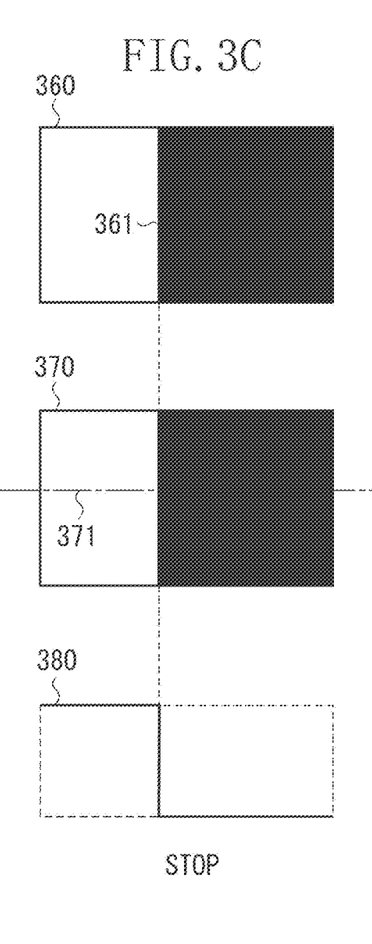

FIGS. 3A to 3C schematically illustrate how a borderline between a white area and a black area, which is moving at a predetermined speed, is imaged at a certain shutter speed.

when the video camera 100 is moving relative to an object at a high relative speed V1, for example, as illustrated in FIG. 3A, suppose that a white-black borderline of the object 300 moves from a position 301 to a position 302 during an opening period of the shutter. A captured image 310 contains largely blurring gradation at the borderline portion. As a result of measurement of the luminance level of a certain horizontal line 321, this luminance level forms a waveform 320.

When the video camera 100 is moving relative to an object at a low relative speed V2, for example, as illustrated in FIG. 3B, suppose that a white-black borderline of an object 330 moves from a position 331 to a position 332. A captured image 340 contains slightly blurring gradation at the borderline portion. The luminance level of a certain horizontal line 341 forms a waveform 350. In this way, the slope of the changing portion of the luminance level is steep, compared to the luminance change when the video camera 100 is moving at the high relative speed V1.

When the video camera 100 stops relative to an object at a relative speed 0, as illustrated in FIG. 3C, a white-black borderline of an object 360 stays at a position 361 without moving therefrom, and the luminance level of a horizontal line 371 in a captured image 370 forms a waveform 380.

As indicated by these waveforms of the luminance levels, increasing the relative speed results in a reduction in the slope angle (a luminance difference between adjacent pixels) of the changing portion of the luminance level, thereby reducing the contrast evaluation value.

Further, since the contrast evaluation value is an integral value of a luminance difference between adjacent pixels, the contrast evaluation value also varies depending on not only the focusing position of the focus lens in the imagine optical system 104 and the relative speed but also a pattern of an object within a detection frame.

Since an object corresponding to the largest luminance difference is a borderline between a white area and a black area, imaging any other object does not generate a slope steeper than the changing portion illustrated in FIG. 3A or 3B as the slope of the waveform of the luminance level in the captured image, as long as the video camera 100 moves at the same relative speed. Therefore, the object corresponding to the largest contrast evaluation value is the pattern of the object that can obtain the waveform of the luminance level repeating the slope illustrated in FIG. 3A or 3B within the range of detection frame.

Figure 4A:
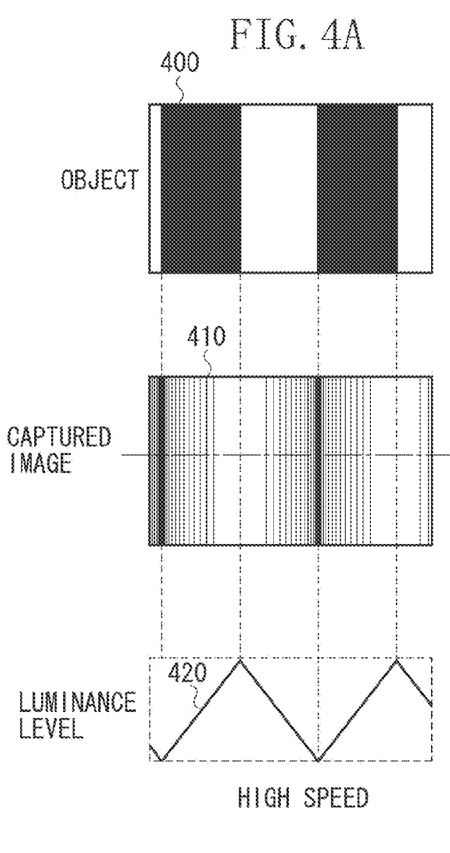
FIGS. 4A and 4B each schematically illustrate an imaging result of an object corresponding to a largest contrast evaluation value.
Figure 4B:
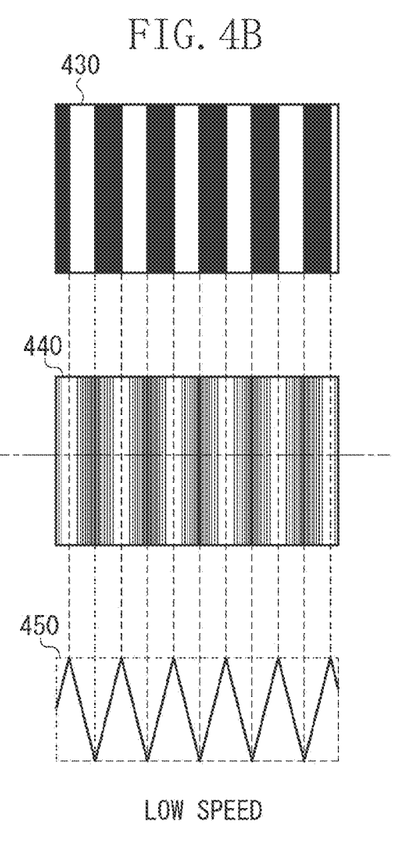

FIGS. 4A and 4B schematically illustrate how objects 400 and 430 with the largest contrast evaluation values are imaged at the same relative speeds V1 and V2 as the relative speeds V1 and V2 illustrated in FIGS. 3A and 3B, respectively.

The objects 400 and 430 are graphics containing a black area and a white area which are switched every time the video camera 100 (or the object) moves by a certain amount during the opening period of the shutter. Captured images 410 and 440 of the objects 400 and 430 contain repeated gradation from black to white and from white to black in the movement direction, and the luminance levels on certain horizontal lines form waveforms 420 and 450, respectively. The slope angles of these waveforms are inversely proportional to the relative speed between the video camera 100 and the object, whereby the contrast evaluation values thereof are also in an inversely proportional relationship with the relative speed.

Hereinbelow, the term "largest contrast evaluation value" is used to refer to a contrast evaluation value acquired from imaging of an object corresponding to the largest contrast evaluation value (a white area and a black area are repeatedly switched at an interval corresponding to a relative speed) for a certain relative speed.

Figure 5:
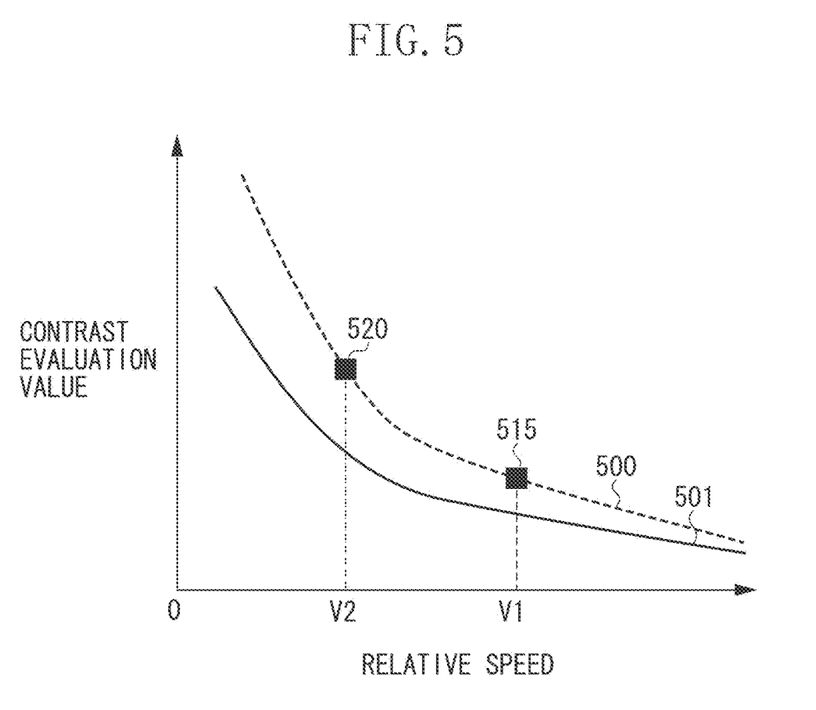
FIG. 5 is a graph illustrating a criterion for determining whether the video camera is moving by following an object.

FIG. 5 is a graph indicating a criterion based on which the microcomputer 101 determines whether the video camera 100 is moving to follow an object. A broken line 500 is a curve representing the relationship between the relative speed of a movement of the video camera 100, which is acquired from the movement detection unit 111, and the largest contrast evaluation value with respect to that speed. For example, assuming that an object is not moving (motionless), the largest contrast evaluation values at the relative speeds V1 and V2 illustrated in FIGS. 4A and 4B are values 515 and 520 illustrated in FIG. 5, respectively.

If a contrast evaluation value detected by the contrast evaluation value detection unit 110 exceeds the broken line 500, this means that the object is not stopped, and is moving in the same direction as the video camera 100. In other words, the microcomputer 101 determines that the video camera 100 is moving to follow the object. If the microcomputer 101 determines that the video camera 100 is moving to follow the object, the microcomputer 101 controls the distortion corrector 108 so as not to perform a distortion correction on that captured image.

However, in the natural world, few objects can acquire the largest contrast evaluation value (a white area and a black area are repeatedly switched at an interval corresponding to a relative speed) at a certain relative speed. Therefore, the present exemplary embodiment multiplies the broken line 500 by a predetermined coefficient (a value smaller than 1), and uses a solid line 501 representing smaller contrast evaluation values as a determination criterion.

Figure 6A:
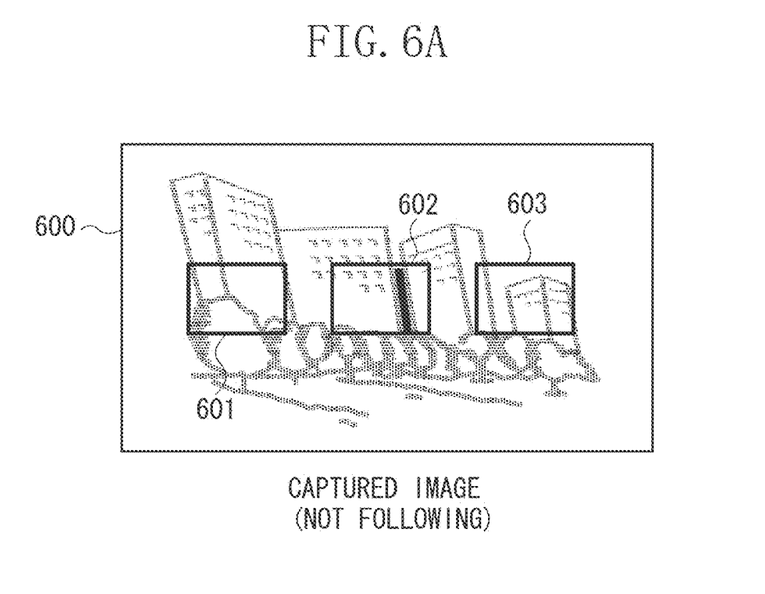
FIGS. 6A to 6D schematically illustrate examples of determinations about whether the video camera is moving by following an object.

FIGS. 6A to 6D schematically illustrate examples in which the microcomputer 101 determines whether the video camera 100 is moving to follow an object for two kinds of capturing scenes. A captured image 600 of a first capturing scene illustrated in FIG. 6A is an image that the video camera 100 captures while being panned to the left side at a speed V relative to a motionless object (e.g., landscape).

At the motionless object (landscape), a distortion occurs due to the rolling shutter method, and an image blur occurs by an amount according to the shutter speed. The movement detection unit 111 detects the speed V of the video camera 100, and the contrast evaluation value detection unit 110 detects contrast evaluation values from three detection frames 601, 602, and 603 for the captured image 600.

Figure 6B:
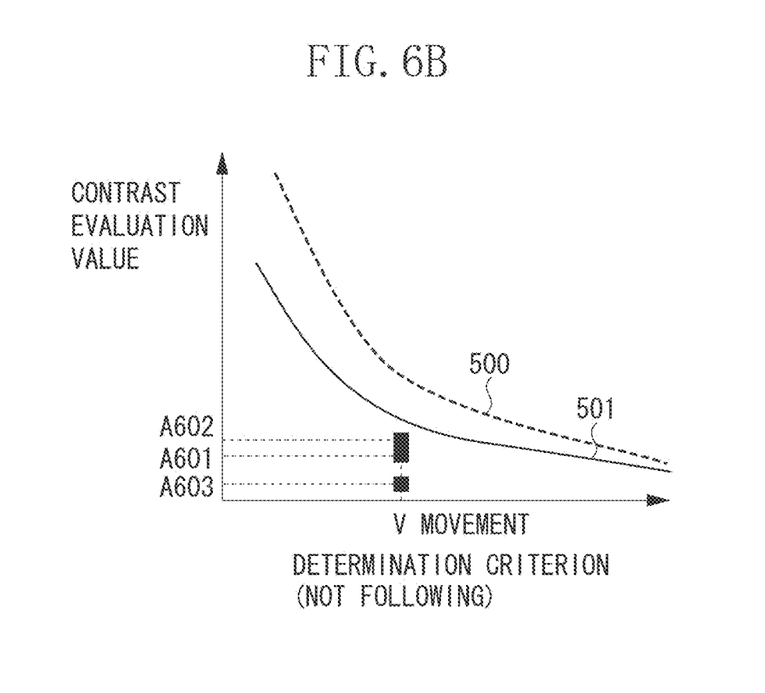

FIG. 6B indicates which positions contrast evaluation values A601 to A603 respectively detected from the three detection frames 601 to 603 are located on the graph serving as the determination criterion illustrated in FIG. 5. All of them are contrast evaluation values smaller than the solid line 501, based on which the microcomputer 101 determines whether the video camera 100 is moving to follow the object. Therefore, the microcomputer 101 determines that the object is not moving, and controls the distortion corrector 108 so as to perform a distortion correction.

Figure 6C:
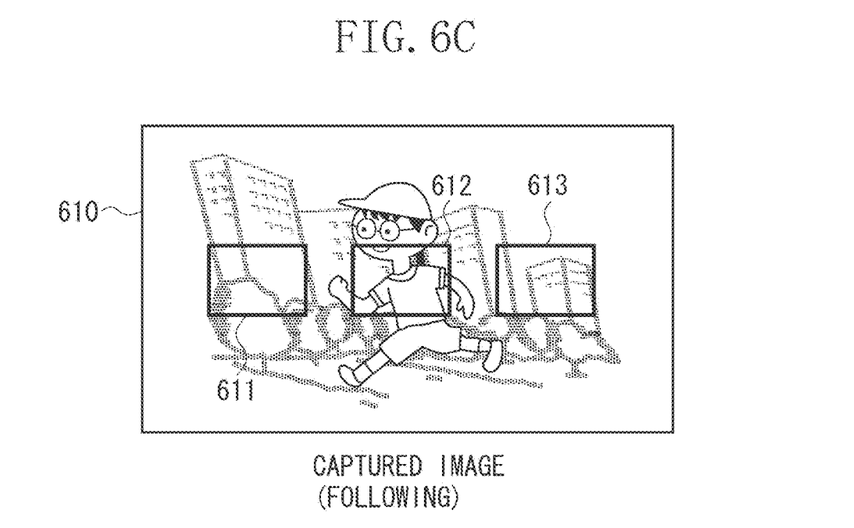

A captured image 610 of the second capturing scene illustrated in FIG. 6C is an image captured when the video camera 100 is moving to follow an object (person) running to the left side at the speed V. Unlike the motionless object (landscape), the object (person) followed by the video camera 100 has only a slight distortion due to the rolling shutter method and a slight image blur by an amount according to the shutter speed.

It should be noted here that, in the present exemplary embodiment, movements of body parts of the person such as his/her arms and legs are ignored, since they are less influential compared to the movement of the whole body. The movement detection unit 111 detects the speed V of the video camera 100, and the contrast evaluation value detection unit 110 detects contrast evaluation values from three detection frames 611 to 613 in the captured image 610.

Figure 6D:
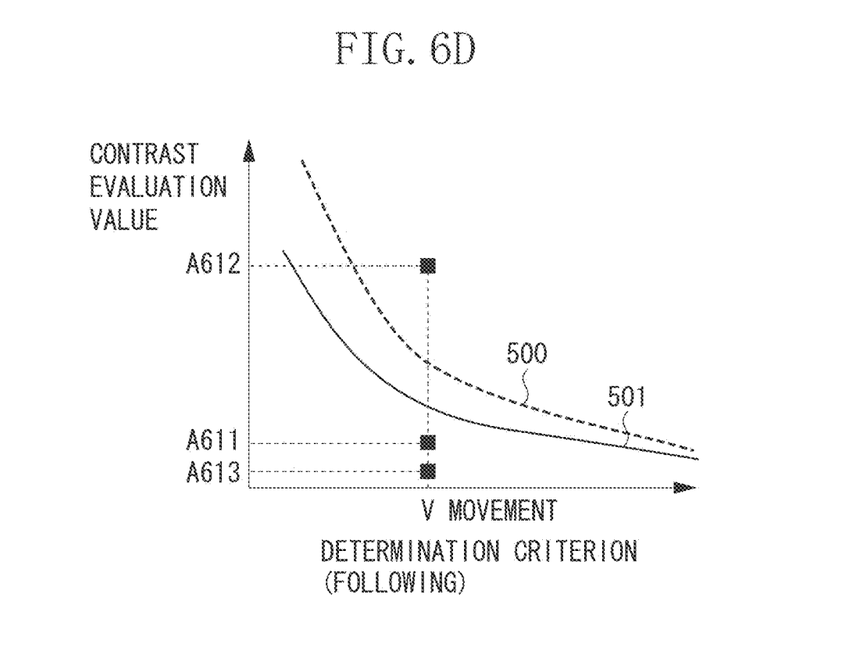

FIG. 6D indicates which positions contrast evaluation values A611 to A613 respectively detected from the three detection frames 611 to 613 are located on the graph serving as the determination criterion illustrated in FIG. 5. Among them, the contrast evaluation value A612 is a contrast evaluation value larger than the solid line 501. Therefore, the microcomputer 101 determines that the video camera 100 is moving to follow the object, and controls the distortion corrector 108 so as not to perform a distortion correction.

In the present exemplary embodiment, the object with the largest contrast evaluation value is determined as the target object. However, the target object may be determined by another scene determination method to be used in, for example, automatic exposure (AE) or AF.

Figure 7A:
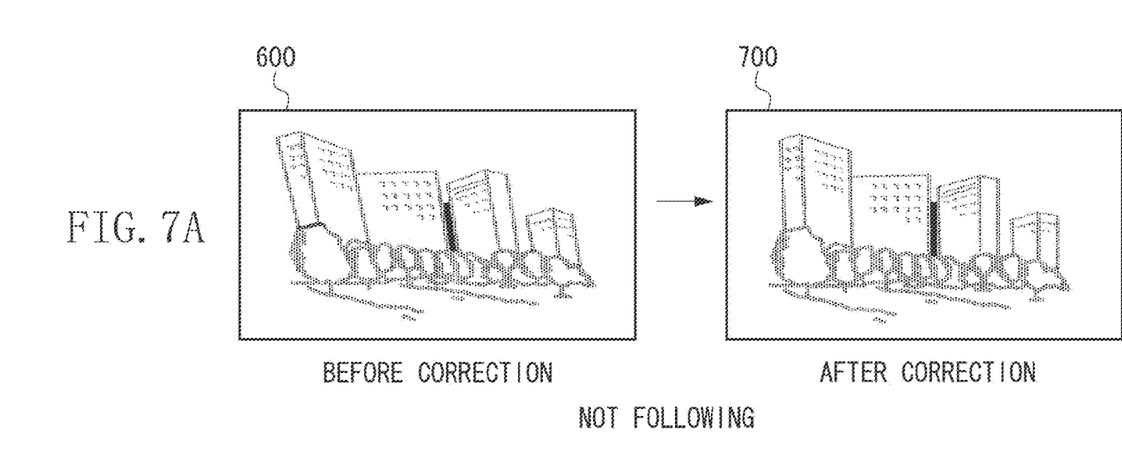
FIGS. 7A and 7B each schematically illustrate an example of a distortion correction according to the first exemplary embodiment.

FIGS. 7A and 7B illustrate results of distortion corrections performed on the two kinds of capturing scenes illustrated in FIGS. 6A to 6D. The distortion corrector 108 performs a distortion correction on the first capturing scene, whereby, as illustrated in FIG. 7A, the distortion at the landscape portion in the image that is the target object of the captured image 600 is effectively corrected in an image 700 as a correction result.

Figure 7B:
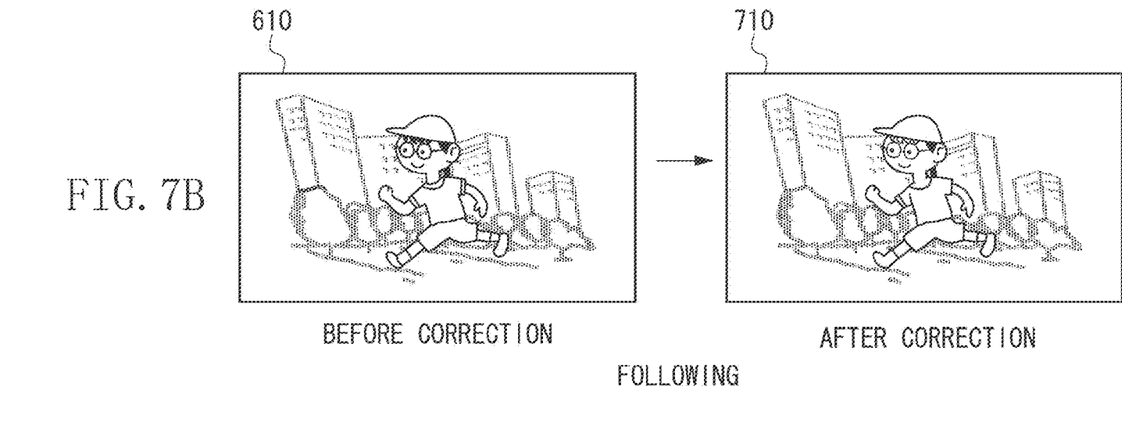

On the other hand, the distortion corrector 108 does not perform a distortion correction on the second capturing scene, whereby, as illustrated in FIG. 7B, the person portion that is the target object of the captured image 610 is appropriately output without being distorted in an image 710 as a correction result.

Figure 8:
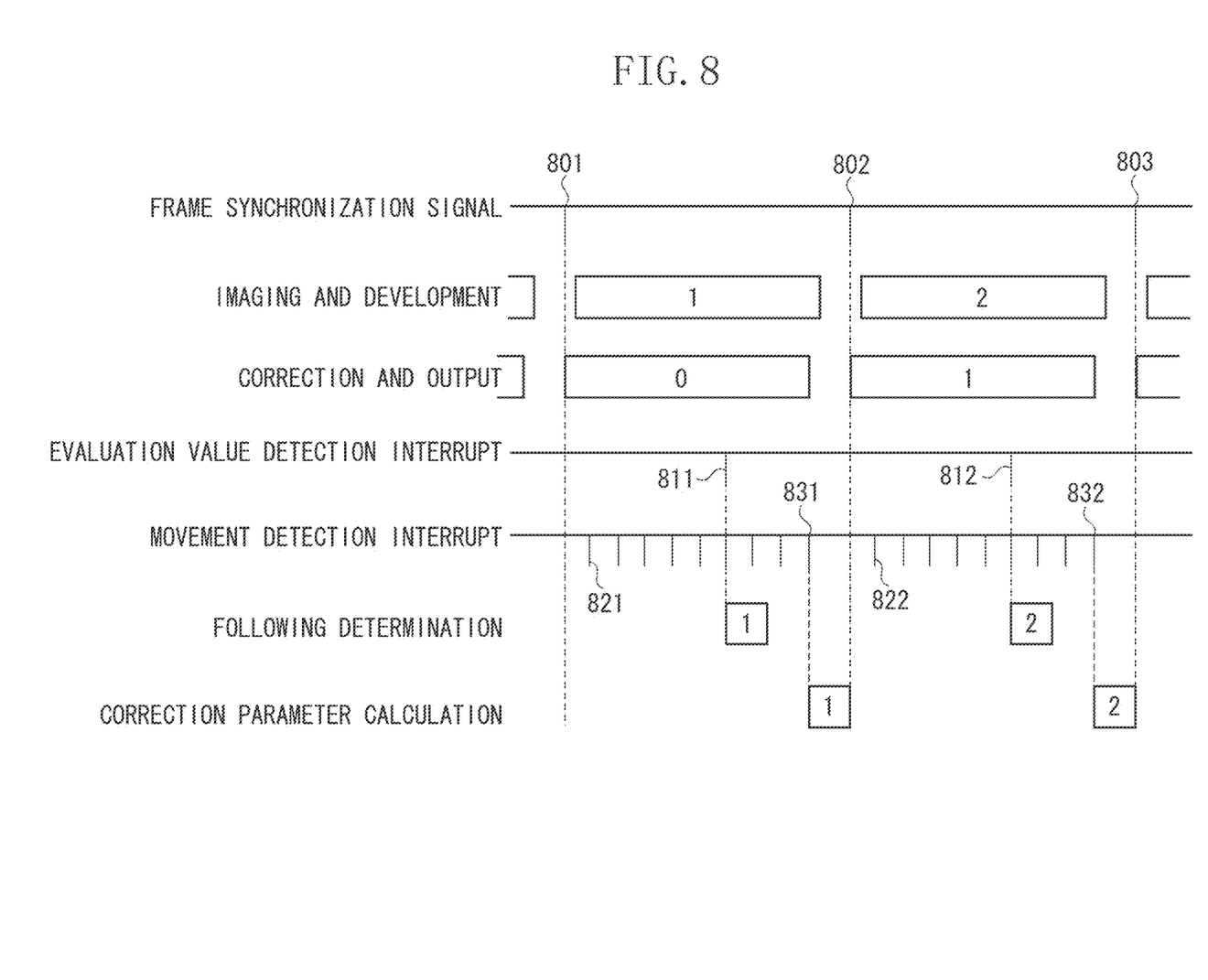
FIG. 8 schematically illustrates timing when a following determination processing and a distortion correction processing are performed.

FIG. 8 is a timing chart illustrating the timing of determining whether the video camera 100 is moving to follow an object, and the timing of performing a distortion correction. When the video camera 100 captures a moving image, the respective blocks of the video camera 100 perform processing on a captured image for each frame every time a frame synchronization signal is asserted (is set in an active state).

For example, as indicated in the "IMAGING AND DEVELOPMENT" section in FIG. 8, a captured image of the first frame is output from the image sensor 105, is developed by the image processing unit 106, and is stored in the buffer memory 107 during the period between frame synchronization signals 801 and 802.

Simultaneously, as indicated in the "CORRECTION AND OUTPUT" section in FIG. 8, a captured image of the immediately previous frame (the 0-th frame) is read out from the buffer memory 107, is corrected by the distortion corrector 108, and is output by the output unit 109. The captured image of the first frame is corrected and output during the next period, i.e., the period between the frame synchronization signals 802 and 803.

The contrast evaluation value detection unit 110 detects a contrast evaluation value from the captured image of the first frame when the contrast evaluation value detection unit 110 can acquire an image in a preset detection frame, and asserts a contrast evaluation value detection interrupt signal 811 to the microcomputer 101.

The movement detection unit 111 performs a movement detection on the captured image of the first frame a plurality of times, and asserts movement detection interrupt signals 821 to 831 to the microcomputer 101 every time the movement detection unit 111 completes the detection. The microcomputer 101 acquires the contrast evaluation value in response to the contras evaluation value detection interrupt signal 811, and the movement detection results in response to the movement detection interrupt signals 821 to 831, respectively.

As indicated in the "FOLLOWING DETERMINATION" section in FIG. 8, the microcomputer 101 determines whether the video camera 100 is moving to follow the object when the microcomputer 101 acquires the contrast evaluation value and the movement detection result of the image in the detection frame of the contrast evaluation value detection unit 110.

As indicated in the "CORRECTION PARAMETER CALCULATION" section in FIG. 8, after the microcomputer 101 acquires all movement detection results for the captured image of the first frame (after receiving the movement detection interrupt signal 831), the microcomputer 101 calculates a correction parameter for a distortion correction, and sets the calculated correction parameter to the distortion corrector 108.

According to the present first exemplary embodiment, it is possible to, in the image sensor 105 employing the rolling shutter method, reduce a distortion of a target object according to whether the video camera 100 is moving to follow the object with use of the contrast evaluation value detection result.

Next, a second exemplary embodiment will be described. A video camera according to the second exemplary embodiment is configured in a similar manner to the video camera 100 illustrated in FIG. 1. In the present exemplary embodiment, the microcomputer 101 does not make a determination using two values about whether the video camera is moving to follow an object. Instead, the microcomputer 101 determines a following degree that indicates how closely the video camera is following an object, and calculates a correction parameter according to this following degree, based on which the distortion corrector 108 corrects a distortion.

Figure 9A:
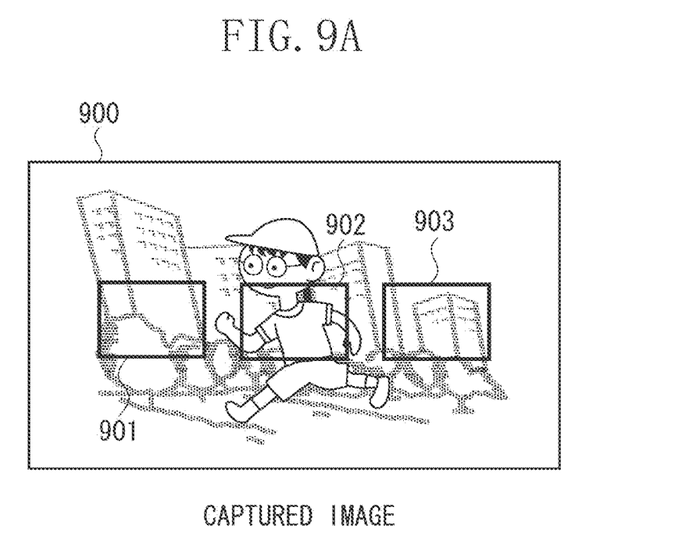
FIGS. 9A and 9B schematically illustrate an example of a determination about a following degree according to a second exemplary embodiment.
Figure 9B:
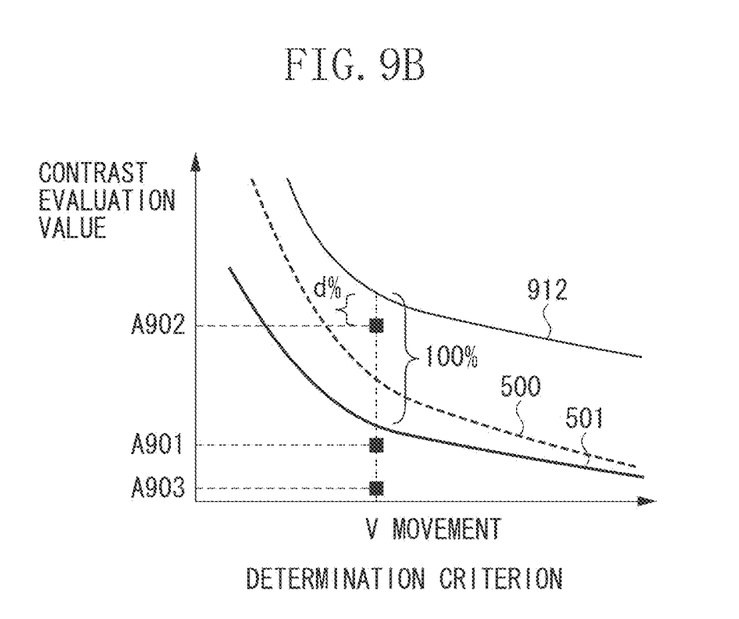

FIGS. 9A and 9B schematically illustrate an example in which the microcomputer 101 determines the following degree that indicates how closely the video camera is following an object. A captured image 900 of a capturing scene illustrated in FIG. 9 is an image that the video camera captures an object (person) moving to the left side at a speed (V-a) while being panned to the left side at the speed V, which is higher than the speed of the object.

At a motionless object (landscape), a distortion occurs due to the rolling shutter method, and an image blur occurs due to an amount according to the shutter speed. Further, at the object (person) moving in the same direction as the video camera at the speed (V-α) lower than the speed of the video camera, a distortion and an image blur occur by an amount smaller than the motionless object (landscape).

The movement detection unit 111 detects the speed V of the video camera. The contrast evaluation value detection unit 110 detects contrast evaluation values from three detection frames 901 to 903 in the captured image 900.

FIG. 9B is a graph illustrating a criterion based on which the microcomputer 101 determines the following degree that indicates how closely the video camera is moving to follow the object. FIG. 9B indicates which positions contrast evaluation values A901 to A903 respectively detected from the three detection frames 901 to 903 are located on the graph serving as the determination criterion.

A broken line 500 and a solid line 501 are the same curves as those about the determination criterion according to the first exemplary embodiment illustrated in FIG. 5. In the present exemplary embodiment, the microcomputer 101 determines that an object corresponding to a contrast evaluation value smaller than the solid line 501 is not moving (motionless). If a target object is not moving, the microcomputer 101 sets 100% as a weight to be applied to a correction parameter calculated from a movement detection result, and controls the distortion corrector 108 to correct a distortion accordingly.

Further, the present exemplary embodiment uses a solid line 912 formed from an addition of a predetermined value to the solid line 501. For an object corresponding to a contrast evaluation value larger than that, the microcomputer 101 determines that the video camera is following the object at the same speed. If the video camera is following the target object at the same speed, the microcomputer 101 sets 0% as a weight to be applied to a correction parameter calculated from a movement detection result, and thereby controls the distortion corrector 108 so as not to perform a correction.

For an object with a contrast evaluation value positioned between the solid line 501 and the solid line 912, the microcomputer 101 determines that the object is moving in the same direction at a speed lower than the speed of the video camera. If the target object is in this state, the microcomputer 101 applies a weight according to the position of the contrast evaluation value to the correction parameter, assuming that the interval between the solid line 501 and the solid line 912 corresponds to the range of 100%, and controls the distortion corrector 108 to perform a correction accordingly.

In this example, the microcomputer 101 determines that the contrast evaluation values A901 and A903, among the three contrast evaluation values, represent motionless objects since they are smaller than the solid line 501, and determines that the object corresponding to the contrast evaluation value A902 is moving in the same direction as the video camera at a speed lower than the speed of the video camera since the contrast evaluation value A902 is located between the solid line 501 and the solid line 912. In this case, the microcomputer 101 weights the correction parameter by d % according to the position of the contrast evaluation value A902 relative to the interval between the solid line 912 and the solid line 501, and controls the distortion corrector 108 to perform a correction accordingly.

In addition, the present exemplary embodiment cannot determine whether an object is moving at a speed (V+β) higher than the speed of the video camera or at a speed (V−β) lower than the speed of the video camera, since the present exemplary embodiment determines the following degree with use of the contrast evaluation value.

However, in the former case, as the value β increases, not only a distortion increases at an object in a captured image in the opposite direction from the movement direction of the video camera, but also an image blur amount according to the shutter speed increases. Therefore, even if a distortion correction is performed based on the speed (V+β), the image blur cannot be effectively corrected, whereby it is difficult to acquire an appropriate correction result.

Therefore, the present exemplary embodiment performs a correction based on the speed (V−β) by the above-described processing, so as not to perform a correction according to a moving object more than necessary.

According to the present exemplary embodiment, it is possible to, in the image sensor 105 employing the rolling shutter method, reduce a distortion of a target object according to the following degree that indicates how closely the video camera is following the object with use of the contrast evaluation value detection result.

Next, a third exemplary embodiment will be described. A video camera according to the present exemplary embodiment is configured in a similar manner to the video camera 100 illustrated in FIG. 1, except that the contrast evaluation value detection unit 110 in the video camera 100 is replaced with a phase difference AF detection unit in the video camera according to the present exemplary embodiment. In the present exemplary embodiment, the microcomputer 101 determines whether the video camera is moving to follow an object with use of an in-focus degree output from the phase difference AF detection unit. This phase difference AF detection unit corresponds to an in-focus detector in the present exemplary embodiment.

There is a plurality of methods for phase difference AF detection, and the phase difference AF detection unit according to the present exemplary embodiment employs a pair of line sensors including another optical system working in cooperation with the imaging optical system 104. Two images (an image A and an image B) having a predetermined disparity therebetween are formed on the respective line sensors, and the microcomputer 101 measures a deviation amount (or a matching degree) between the current position of the focus lens in the imaging optical system 104 and an in-focus position based on an image space acquired from the line sensors, and drives the focus lens in the imaging optical system 104 to the in-focus position.

Figure 10A:
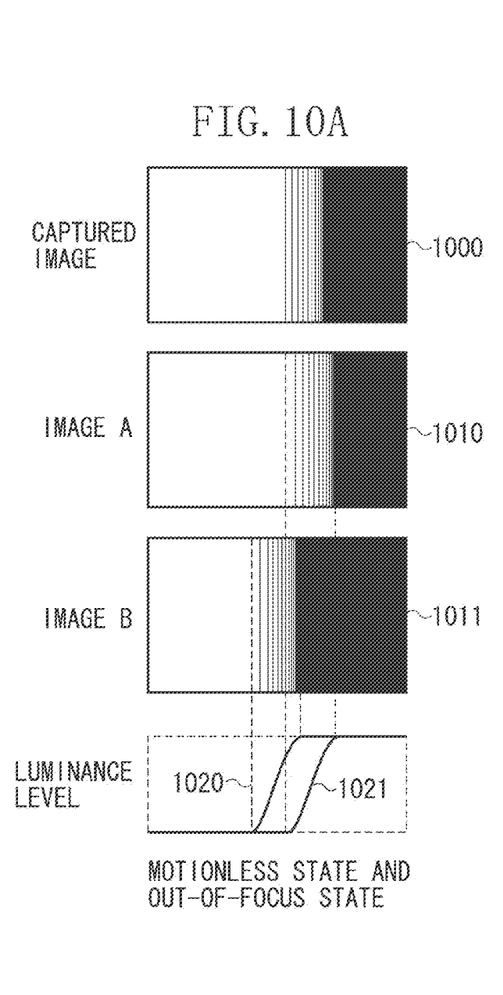
FIGS. 10A to 10C each schematically illustrate a detection result of a phase difference automatic focusing (AF) detection unit according to a third exemplary embodiment.

For example, suppose that the video camera captures an image of a motionless object having a white-black borderline. If the current position of the focus lens in the imaging optical system 104 is offset from an in-focus position, a captured image 1000 contains a blur at the white-black borderline portion, as illustrated in FIG. 10A.

Figure 10B:
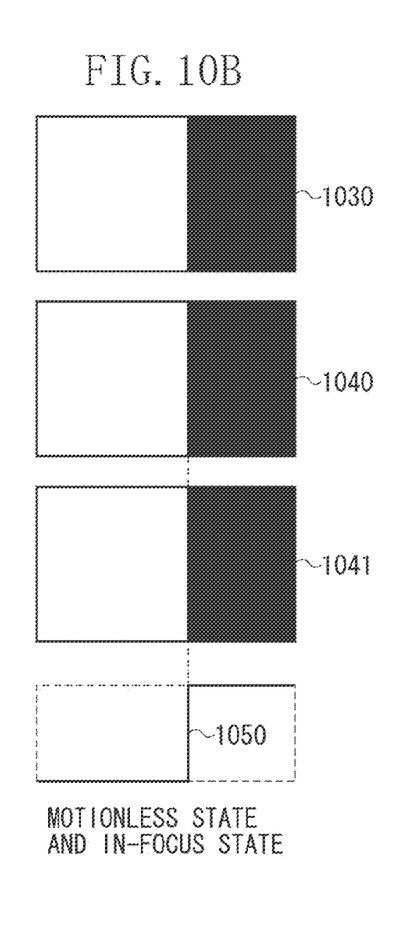

An image A 1010 and an image B 1011 formed on the line sensors have an image distance, and their respective luminance levels form waveforms indicated by curves 1020 and 1021. When the microcomputer 101 drives the focus lens in the imaging optical system 104 to the in-focus position based on this image distance, the video camera captures an image 1030 containing a clear white-black borderline, as illustrated in FIG. 10B.

At this time, there is no image distance between an image A 1040 and an image B 1041 formed on the line sensors, and the waveforms of the luminance levels thereof are aligned with each other as a curve 1050.

Figure 10C:
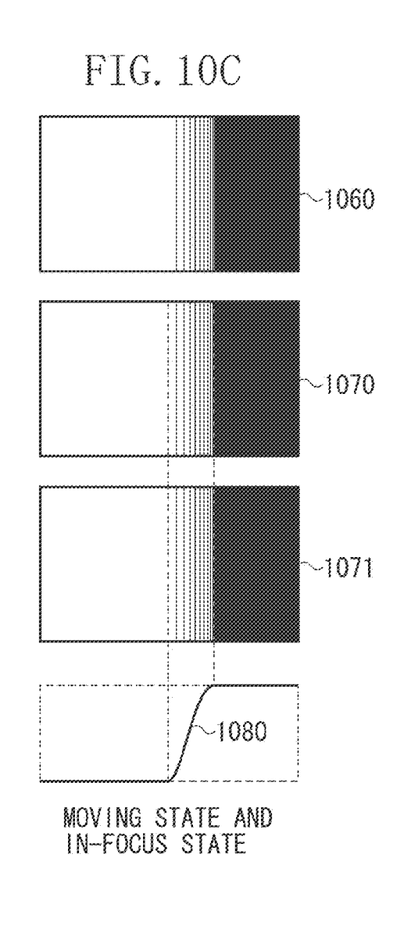

If the object moves horizontally in this in-focus state, the video camera captures an image 1060 containing a white-black borderline portion blurring according to the shutter speed, as illustrated in FIG. 10C. There is no image distance between an image A 1070 and an image B 1071 formed on the line sensors, and the waveforms of the luminance levels thereof are aligned with each other as a curve 1080.

The waveform 1050 corresponding to the motionless object and the waveform 1080 corresponding to the moving object are both measured when the focus lens is positioned at the in-focus position, but the slope at the changing portion of the luminance level (a luminance difference between adjacent pixels) becomes less steep as the relative speed increases, like the contrast evaluation value indicated in the description of the first exemplary embodiment.

Even if the video camera uses phase difference AF detection, it is possible to determine whether the video camera is following an object, like the first exemplary embodiment, by using this change in the luminance level in a similar manner to the contrast evaluation value indicated in the description of the first exemplary embodiment.

Further, use of phase difference AF enables determination whether a blur in a captured image is due to a lens position. Therefore, even when the lens position is offset from an in-focus position, the microcomputer 101 can determine whether the video camera is moving to follow an object under less influence thereof.

According to the present exemplary embodiment, it is possible to, in the image sensor 105 employing the rolling shutter method, reduce a distortion of a target object according to whether the video camera is following the object with use of the phase difference AF detection result.

The object of the present disclosure can be achieved even by using a phase difference AF detection sensor using an optical image split by, for example, a half mirror in the same optical system, or a phase difference AF detection sensor with the phase difference AF detection function included in the image sensor 105, instead of the pair of line sensors including another optical system described according to the present exemplary embodiment.

While the present disclosure has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-170749 filed Aug. 4, 2011, which is hereby incorporated by reference herein in its entirety.

What is claimed is:

1. An imaging apparatus comprising:
    an imaging unit configured to capture an image by using a rolling shutter method;
    a movement detection unit configured to detect a movement amount of the imaging apparatus relative to an object;
    an in-focus detector configured to detect an in-focus degree to the object;
    a distortion corrector configured to correct a distortion in the image due to the rolling shutter method by changing a reading position of each line in the image based on the movement amount; and
    a control unit configured to determine a correction amount of the distortion due to the rolling shutter method from the movement amount detected by the movement detection unit and the in-focus degree detected by the in-focus detector.

2. The imaging apparatus according to claim 1, wherein the in-focus detector detects a contrast evaluation value by a contrast detection method.

3. The imaging apparatus according to claim 1, wherein the in-focus detector is configured to detect a matching degree between two images having a disparity there between by a phase difference detection method.

4. The imaging apparatus according to claim 1, wherein the control unit controls the distortion corrector so as not to correct the distortion in the image due to the rolling shutter method, in a case where the control unit determines that the imaging apparatus is following the object based on a relationship between the movement amount and the in-focus degree.

5. The imaging apparatus according to claim 1, wherein the control unit determines a following degree indicating how closely the imaging apparatus is following the object based on a relationship between the movement amount and the in-focus degree, and controls the distortion corrector so as to correct the distortion due to the rolling shutter method according to the following degree.

6. The imaging apparatus according to claim 2, wherein the control unit controls the distortion corrector so as not to correct the distortion in the image due to the rolling shutter method, in a case where the control unit determines that the imaging apparatus is following the object based on a relationship between the movement amount and the in-focus degree.

7. The imaging apparatus according to claim 2, wherein the control unit determines a following degree indicating how closely the imaging apparatus is following the object based on a relationship between the movement amount and the in-focus degree, and controls the distortion corrector so as to correct the distortion due to the rolling shutter method according to the following degree.

8. The imaging apparatus according to claim 3, wherein the control unit controls the distortion corrector so as not to correct the distortion in the image due to the rolling shutter method, in a case where the control unit determines that the imaging apparatus is following the object based on a relationship between the movement amount and the in-focus degree.

9. The imaging apparatus according to claim 3, wherein the control unit determines a following degree indicating how closely the imaging apparatus is following the object based on a relationship between the movement amount and the in-focus degree, and controls the distortion corrector so as to correct the distortion due to the rolling shutter method according to the following degree.

10. A control method for controlling an imaging apparatus including an imaging unit configured to capture an image by using a rolling shutter method, the control method comprising:
    detecting a movement amount of the imaging apparatus relative to an object;
    detecting an in-focus degree to the object;
    correcting a distortion in the image due to the rolling shutter method by changing a reading position of each line in the image based on the movement amount; and
    determining a correction amount of the distortion due to the rolling shutter method from the detected movement amount and the detected in-focus degree.

11. The control method according to claim 10, wherein the in-focus detection is performed based on a contrast evaluation value obtained by a contrast detection method.

12. The control method according to claim 10, wherein the in-focus detection is performed by detecting a matching degree between two images having a disparity therebetween by using a phase difference detection method.

13. The control method according to claim 10, wherein the distortion correction to correct the distortion in the image generated due to the rolling shutter method, in a case where it is determined that the imaging apparatus is following the object based on a relationship between the movement amount and the in-focus degree.

14. The control method according to claim 10, wherein a following degree indicating how closely the imaging apparatus is following the object is determined based on a relationship between the movement amount and the in-focus degree, and the distortion correction to correct the distortion in the image generated due to the rolling shutter method is performed according to the following degree.

15. The control method according to claim 11, wherein the distortion correction to correct the distortion in the image generated due to the rolling shutter method is not performed, in a case where it is determined that the imaging apparatus is following the object based on a relationship between the movement amount and the in-focus degree.

16. The control method according to claim 11, wherein a following degree indicating how closely the imaging apparatus is following the object is determined based on a relationship between the movement amount and the in-focus degree, and the distortion correction to correct the distortion in the image generated due to the rolling shutter method according to the following degree.

17. The control method according to claim 12, wherein the distortion correction to correct the distortion in the image generated due to the rolling shutter method is not performed, in a case where it is determined that the imaging apparatus is following the object based on a relationship between the movement amount and the in-focus degree.

18. The control method according to claim 12, wherein the control includes a following degree indicating how closely the imaging apparatus is following the object is determined based on a relationship between the movement amount and the in-focus degree, and the distortion correction to correct the distortion, in the image, generated due to the rolling shutter method is performed according to the following degree.

* * * * *